March 30, 1948.　　W. COULSON　　2,438,741
RETRACTABLE BORING TOOL ASSEMBLY
Filed Sept. 27, 1945　　2 Sheets-Sheet 2
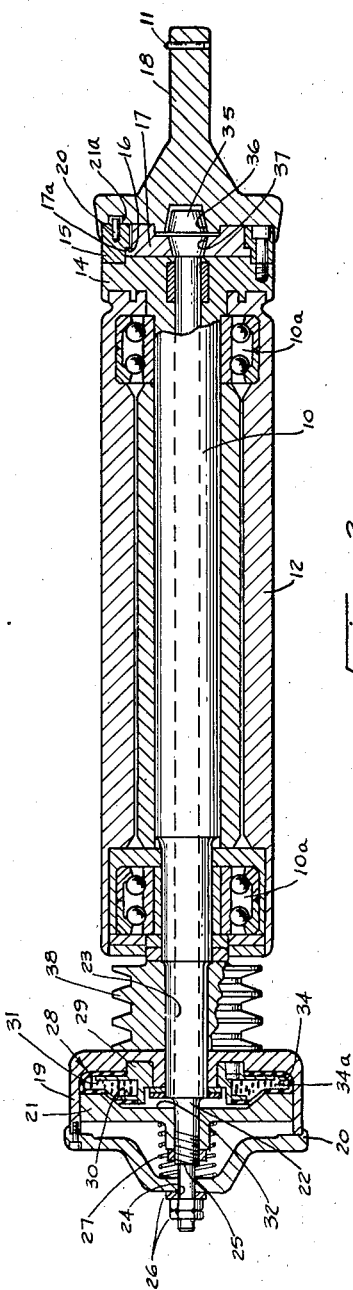
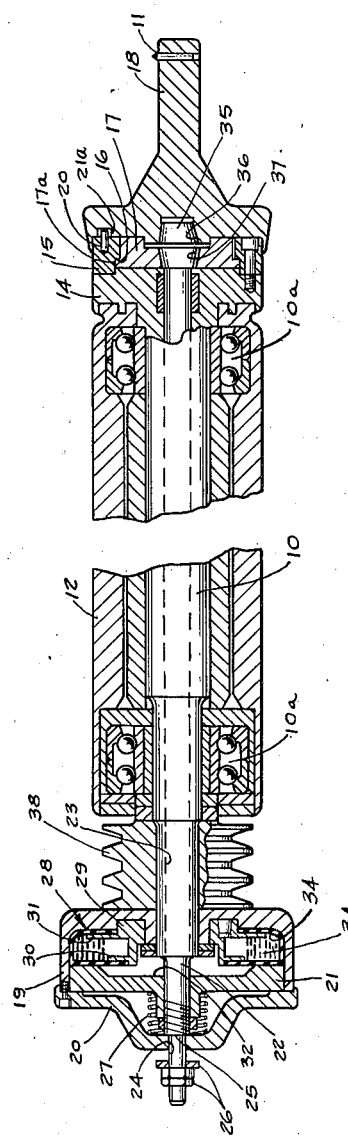
INVENTOR.
Walter Coulson
BY Carlson, Pitzer,
Hubbard & Wolfe
Att'ys Patented Mar. 30, 1948

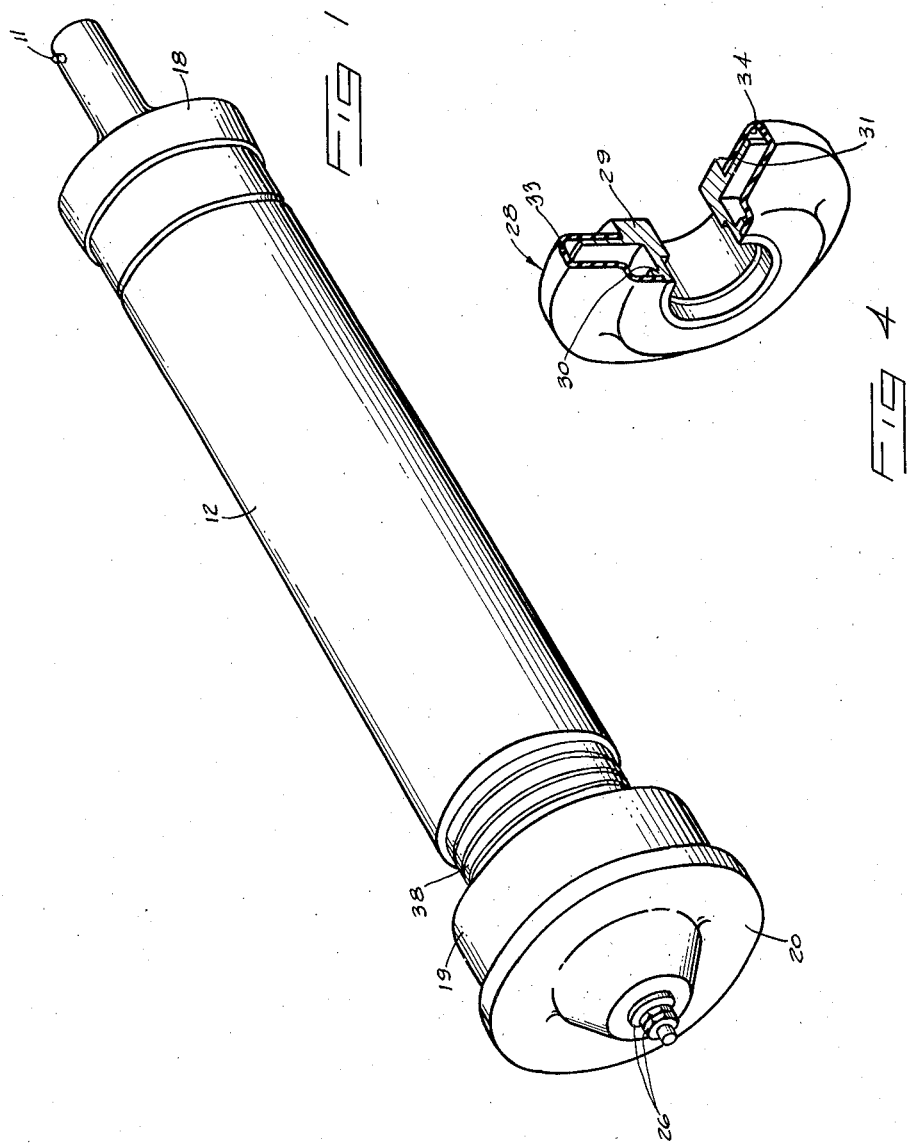

2,438,741

UNITED STATES PATENT OFFICE 2,438,741

RETRACTABLE BORING TOOL ASSEMBLY

Walter Coulson, Detroit, Mich., assignor to Ex-Cell-O Corporation, Detroit, Mich., a corporation of Michigan Application September 27, 1945, Serial No. 618,935

8 Claims. (Cl. 77—58)

1

The present invention pertains to single point boring or fly tools. Such tools commonly embody a cutter point rotated at high speed to generate a cylindrical surface in a bore. It is with the retraction of the cutter point preparatory to withdrawal of the tool from the finished bore, to avoid marring the machined surface, that the present invention is primarily concerned.

In general, the aim of the present invention is to provide an arrangement for utilizing a fluid type pressure actuator for effecting shift of the tool from idle to working position but in which provision is made for generating the fluid pressure within the boring tool assembly itself and in accordance with the speed of spindle rotation so that the entire structure is of a simple self-contained character.

Further objects and advantages of the invention will become apparent as the following description proceeds, taken in connection with the accompanying drawings in which:

Figure 1 is a perspective view of a retractable boring tool assembly embodying the present invention.

Figs. 2 and 3 are longitudinal sectional views of the assembly shown in Fig. 1 and with the cutter point shown respectively in its retracted and projected positions.

Fig. 4 is a fragmentary detail perspective view on a somewhat enlarged scale of an annular container for fluent material which is included in the assembly.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the boring tool assembly there illustrated includes a spindle 10 (Fig. 2) having a laterally facing cutter or point 11 suitably mounted on its forward end portion for limited movement radially of the spindle into and out of working position. A fluid type actuator, housed in the present instance at the opposite or rear end of the spindle, serves to shift the cutter point from its idle or retracted position outward into working position.

In the particular construction illustrated, the spindle 10 is journaled in antifriction bearings

2

10a within a cylindrical housing 12 which may be fixed to a machine frame (not shown) or other suitable mounting. Rigid with the forward end of the spindle is a face plate 14 having fixed thereto a retaining ring 15 undercut to define an annular shoulder 16. A disk shaped plate or quill support 17 is held against axial displacement with reference to the spindle by the ring 15, the support 17 having a peripheral annular flange 17a thereon which underlies the shoulder 16. Sufficient lateral clearance between the perimeter of the support 17 and the surrounding ring 15 is provided, however, to accomodate a requisite degree of radial movement which is to be imparted to the cutting tool 11, this being on the order of a few thousandths of an inch.

Rigid with the support 17 is a quill or cutter point support 18 carrying the cutter or boring tool 11 of suitable form such, for example, as a diamond. A dowel 20 fixed in the ring 15 and having a projecting end portion with flattened sides is received in a guide slot 21a in the quill 18, the slot being arranged to project radially of the spindle axis and in parallelism with the longitudinal axis of the cutter point 11. The quill 18 is thus guided by the dowel and slot for limited movement radially of the spindle axis and in a direction such that the cutter point will move into and out of contact with the walls of a bore in a workpiece (not shown) into which the nose of the quill 18 may be entered.

A fluid actuated type mechanism is, as heretofore noted, provided for shifting the quill 18 automatically between working and idle positions. In general, the arrangement is such that when the spindle attains a predetermined operating speed, the quill is located in its radially displaced position shown in Fig. 3 ready for boring. And, on the other hand, when the spindle is stopped the quill 18 and its cutter point 11 are automatically retracted to the idle position shown in Fig. 2 in which the cutter point, being withdrawn, will be out of contact with the work.

In the illustrated form of actuator mechanism, a cylinder or housing 19 of cup shape is provided, the same being fixed to the rear end of the spindle 10 to revolve with it. The outer end of the cylinder is closed by cover 20 and a piston 21 is arranged to slide axially within the cylinder. This piston is fixed to a drawbar 22 which is slidably received in an axial bore 23 extending through the spindle 10. The tail end of the drawbar is of reduced cross section and passes through an aperture 24 in the housing 20 which guidingly receives it. A shoulder 25 on the drawbar and an adjustable lock nut and washer assembly 26 on such bar coact with the cover 20 to define the limits of endwise movement of the drawbar.

A helical compression spring 27 interposed between the cover 20 and outer face of the piston 21 yieldably urges the piston and attached drawbar to the right (as viewed in Fig. 2). Fluid pressure is applied to the opposite or right-hand end of the piston to force it to the left against the bias of the spring 27. For that purpose, a housing designated generally as 28 is secured to the spindle 10 and interposed between the forward face of the piston and the adjacent end wall of the cylinder 19. In the present instance such housing 28 includes a metal collar 29 fixed to the spindle and having two annular flanges 30 and 31 therein, the flange 30 being of lesser height than the flange 31 and dimensioned to fit within the dished or relieved area 32 on the adjacent face of the piston. Fixed to the flanges 30, 31 is an annulus 33 of distortable, resilient material such as rubber and which may be bonded to the flanges to fix it in place. The side of the annulus 33 adjacent the piston 21 is offset to conform to the latter's contour as indicated in Figs. 2 and 4.

The annular chamber 34 defined within the housing 28 contains a body of fluent material 34a. By the term "fluent material" I mean to designate any material which is capable of easily flowing or moving and specifically a liquid such as mercury or a finely divided solid material such as pellets of lead. Preferably, the housing 28 is loaded with a sufficient volume of such fluent material that the chamber 34 is substantially filled when the housing is in the collapsed condition illustrated in Fig. 2.

When the spindle 10 is at rest, the parts of the mechanism occupy the position shown in Fig. 2, the piston 21 and attached drawbar 22 being thrust forward by the expanded compression spring 27. As the spindle 10 is revolved and brought up to normal operating speed, however, the fluent material within the chamber 34 is impelled outwardly by centrifugal force, thus generating a pressure in the same which tends to bulge the annulus 33 outward. The peripheral and forward side walls of such annulus are closely confined by the cylinder 19 so that the wall of the annulus adjacent the forward face of the piston is the only one which is free to distort. This wall is thus bulged outward, forcing the piston to the left and into the position shown in Fig. 3. It is such motion of the piston, incident to the rotation of the spindle, that is used for automatically shifting the quill 18 radially from idle to working position.

In the present instance, the drawbar 22 is arranged to shift the quill 18 radially or laterally, in response to longitudinal shift of the drawbar, by a wedging or camming action. For that purpose, a head 35 is fixed to the forward end of the drawbar, such head presenting oppositely tapered faces of frustoconical form which are received in generally complementally shaped recesses or sockets 36 and 37 in the quill 18 and its attached supporting plate 17. The recesses 36 and 37 are, however, slightly larger in diameter than the portions of the head which they receive and are offset in diametrically opposite directions from the drawbar axis. The direction of such offset parallels the longitudinal axis of the cutter 11. Accordingly, when the drawbar 22 is forced to the right into the position shown in Fig. 2, the head 35 engages the lower wall of the recess 36 and wedgingly forces the quill downward (as viewed in Fig. 2) to withdraw the cutter point toward the spindle axis. Conversely, when the drawbar 22 is forced to the left into the position shown in Fig. 3, the head 35 engages the upper wall of the other recess 37 and thus wedgingly forces the supporting plate 17 and its attached quill 18 radially outward to displace the cutter point 11 outward with reference to the spindle axis and into working position.

Any suitable means may be employed for revolving the spindle 10. In the present instance, a peripherally grooved pulley 38 is fixed to the spindle, being interposed between the adjacent ends of the cylinder 19 and housing 12 and may connect the spindle to a drive motor (not shown) by the usual endless V-belts.

The operation of the disclosed mechanism will, in general, be clear from the foregoing. By way of brief recapitulation, it may be assumed first of all that the spindle is idle and withdrawn from the work. In such case, the fluent material within the chamber 34 is relieved of pressure so that the compression spring 27 retains the piston 21 forced to the right and the cutter point 11 thus retracted. To initiate the boring cycle, the spindle is brought up to speed. As an incident to such rotation of the spindle, pressure is generated in the fluent material within the chamber 34 by centrifugal force, causing the piston 21 to be thrust outward until the shoulder 25 on the drawbar abuts against the cover 20. The axial displacement of the drawbar shifts the cutter point radially outward into a positively fixed working position. Thereafter, a relative feed movement of the work and spindle is effected in a direction axially of the latter at a suitable feed rate to accomplish the desired boring operation. Upon the completion of the same, the spindle is stopped, whereupon the resilient annulus 33 is collapsed under the pressure of the piston 21 urged forward by the spring 27 so that the cutter point 11 is automatically retracted. With the latter thus retracted, a relative clearance motion of the work and spindle axially of the latter may be effected without danger of scratching or marring the bore by the cutter point.

It will thus be perceived that a fluid actuated type mechanism has been provided for effecting automatic retraction and projection of the cutter or point of a fly tool and which is fully automatic in character. Moreover, the entire apparatus is constituted in a completely self-contained unit eliminating the necessity of any outside pump or similar source of pressure fluid.

I claim as my invention:

1. In a retractive boring tool assembly, the combination of a rotatable spindle having a cutter element mounted thereon for limited radial movement between a laterally projected working position and a retracted idle position, biasing means for yieldably urging said element into idle position, an actuating piston operable upon movement thereof to shift said element to working position against the urging of said biasing means, means for confining a body of fluent material in operative relation with said piston, and means connecting said confining means with said spindle for rotation therewith to generate in the contained body of fluent material by centrifugal force a pressure effective to shift said piston.

2. In a retractable boring tool assembly, the combination of a rotatable spindle having a cutter element mounted thereon for limited radial movement between a laterally projected working position and a retracted idle position, means for yieldably urging said element into idle position, and means carried by said spindle and revoluble therewith for generating a fluid pressure in response to rotation of said spindle and applying the pressure so generated to shift said element to working position.

3. In a retractable boring tool assembly, the combination with a revoluble spindle carrying a cutter point shiftable radially of the axis of spindle rotation, of a container connected to said spindle and adapted to confine a body of fluent material, said container having a resilient wall lying generally transverse to said spindle axis and which is bulgeable outward generally axially of said spindle upon application of internal pressure, and means for shifting said cutter in response to a bulging of said wall.

4. In a retractable boring tool assembly, the combination of a revoluble spindle carrying a cutter point shiftable radially of the axis of spindle rotation, a cylinder fixed to said spindle for rotation therewith and having a piston slidable axially therein, a body of fluent material in said cylinder and confined thereby on one side of said piston, spring means for yieldably urging said piston toward said one side, and means for shifting said cutter in response to axial shift of said piston.

5. In a retractable boring tool assembly, the combination of a revoluble spindle carrying a cutter point shiftable radially of the axis of spindle rotation, a cylinder fixed to said spindle for rotation therewith and having a piston slidable axially therein, a container having a bulgeable wall located within said cylinder and presented to one face of said piston, spring means for yieldably urging said piston toward said container, and means for shifting said cutter in response to axial shift of said piston.

6. In a retractable boring tool assembly, the combination of a revoluble spindle carrying a cutter point shiftable radially of the axis of spindle rotation, a cylinder coaxial with said spindle and fixed thereto for rotation therewith, a piston slidable axially in said cylinder, a body of fluent material in said cylinder and confined thereby on one side of said piston, spring means for yieldably urging said piston toward said one side, and means including a drawbar fixed to said piston and extending axially of said spindle for shifting said cutter in response to axial shift of said piston.

7. In a retractable boring tool assembly, the combination of a revoluble spindle carrying a cutter point shiftable radially of the axis of spindle rotation, a cylinder coaxial with said spindle and fixed thereto for rotation therewith, a piston slidable axially in said cylinder, an annular resilient container loaded with a body of fluent material and fixed within said cylinder coaxially therewith and in position such that a side wall of said container is presented to one face of said piston to bulge out against the same when said body is subjected to centrifugal force, the periphery and opposite side wall of said container being constrained against bulging by the surrounding portions of said cylinder, spring means for yieldably urging said piston toward said container, and means for shifting said cutter in response to axial shift of said piston.

8. In a retractable boring tool assembly, the combination of a tubular spindle journaled for rotation, a head adapted to receive a laterally projecting fly cutting tool, means supporting said head on the forward end of said spindle for limited movement transaxially of the latter and in a direction longitudinally of said cutting tool, a drawbar extending through said tubular spindle and having cam means thereon coacting with said head to shift the latter transaxially of said spindle in response to endwise movement of said drawbar, spring means biasing said drawbar to move endwise in a direction to withdraw said head and a cutter thereon inward toward their axis of rotation, said drawbar having a piston on the end thereof opposite said head, a casing having a distortable wall toward which said piston is advanced by said spring means, and said casing being adapted to confine a body of fluent material and being connected to said spindle for rotation therewith, whereby the pressure generated in the body of fluent material by rotation thereof serves to distort said casing wall against said piston and effect a movement of said drawbar such as to project the fly tool radially outward.

WALTER COULSON.

REFERENCES CITED

The following references are of record in the file of this patent:

UNITED STATES PATENTS

| Number | Name | Date |
|---|---|---|
| 1,618,644 | Dickson | Feb. 22, 1927 |
| 2,237,692 | Stewart | Apr. 8, 1941 |

FOREIGN PATENTS

| Number | Country | Date |
|---|---|---|
| 763 | Great Britain | Feb. 24, 1877 |